US010825355B2

(12) United States Patent
Varga et al.

(10) Patent No.: US 10,825,355 B2
(45) Date of Patent: Nov. 3, 2020

(54) TOOTHBRUSH ORIENTATION SYSTEM

(71) Applicant: PLAYBRUSH LIMITED, Greater London (GB)

(72) Inventors: Paul Varga, London (GB); Matthaus Ittner, Vienna (AT); Tolulope Ogunsina, Dublin (IE); Wiktor Grajkowski, Jozefow (PL); Patrick Diem, Vienna (AT)

(73) Assignee: PLAYBRUSH LIMITED, Greater London (GB)

( * ) Notice: Subject to any disclaimer, the term of this patent is extended or adjusted under 35 U.S.C. 154(b) by 327 days.

(21) Appl. No.: 15/753,370

(22) PCT Filed: Mar. 29, 2016

(86) PCT No.: PCT/GB2016/050864
§ 371 (c)(1),
(2) Date: Feb. 19, 2018

(87) PCT Pub. No.: WO2017/029469
PCT Pub. Date: Feb. 23, 2017

(65) Prior Publication Data
US 2018/0247565 A1 Aug. 30, 2018

(30) Foreign Application Priority Data
Aug. 18, 2015 (GB) .................... 1514668.1

(51) Int. Cl.
*G09B 19/00* (2006.01)
*A46B 15/00* (2006.01)
(Continued)

(52) U.S. Cl.
CPC ............ *G09B 19/0084* (2013.01); *A46B 5/02* (2013.01); *A46B 15/0002* (2013.01);
(Continued)

(58) Field of Classification Search
CPC ...... A63F 13/211; A63F 13/24; A63F 13/428; A63F 13/85; A63F 13/92; A63F 13/21;
(Continued)

(56) References Cited

U.S. PATENT DOCUMENTS 5,894,453 A 4/1999 Pond
5,960,507 A 10/1999 Dutra et al.
(Continued)

FOREIGN PATENT DOCUMENTS

CN 204427087 7/2015
EP 3010370 A1 4/2016
(Continued)

OTHER PUBLICATIONS

UK Search Report cited in Application No. GB1514668.1 dated Nov. 23, 2015, 2 pages.
(Continued)

*Primary Examiner* — Timothy A Musselman
(74) *Attorney, Agent, or Firm* — Cooper Legal Group, LLC

(57) ABSTRACT

A system for determining the orientation of a toothbrush (4), the system comprising an orientation sensor (27) configured for attachment to a toothbrush (4) and one or more processors (29) configured to receive orientation information from the orientation sensor (27). The one or more processors (29) are further configured to determine whether the sensor (27) is in a first orientation (41) or a second orientation (33). The first orientation (41) corresponds to use of the toothbrush (4) on a surface of teeth on the left (42) of a user's mouth. The second orientation (33) corresponds to use of the toothbrush (4) on a surface of teeth on the right (40) of a user's mouth.

20 Claims, 12 Drawing Sheets

(51) Int. Cl.

| | | |
|---|---|---|
| *A46B 17/02* | (2006.01) | |
| *A46B 5/02* | (2006.01) | |
| *A63F 13/211* | (2014.01) | |
| *A63F 13/24* | (2014.01) | |
| *A63F 13/428* | (2014.01) | |
| *A63F 13/85* | (2014.01) | |
| *A63F 13/92* | (2014.01) | |
| *G09B 5/02* | (2006.01) | |

(52) U.S. Cl.
CPC ...... *A46B 15/0006* (2013.01); *A46B 15/0022* (2013.01); *A46B 15/0038* (2013.01); *A46B 17/02* (2013.01); *A63F 13/211* (2014.09); *A63F 13/24* (2014.09); *A63F 13/428* (2014.09); *A63F 13/85* (2014.09); *A63F 13/92* (2014.09); *G09B 5/02* (2013.01); *A46B 2200/1066* (2013.01)

(58) Field of Classification Search
CPC .. A63F 13/42; A46B 5/00; A46B 5/02; A46B 15/0002; A46B 15/0006; A46B 15/0022; A46B 15/0038; A46B 17/00; A46B 17/02; A46B 2200/1066; G09B 19/00; G09B 19/0084
See application file for complete search history.

(56) References Cited

U.S. PATENT DOCUMENTS

| | | | |
|---|---|---|---|
| 2006/0040246 A1 | 2/2006 | Ding et al. | |
| 2011/0010876 A1 | 1/2011 | Iwahori et al. | |
| 2014/0283319 A1 | 9/2014 | Truocchio | |
| 2014/0310900 A1 | 10/2014 | Curry et al. | |
| 2016/0143718 A1* | 5/2016 | Serval | A61C 17/221 15/22.1 |

FOREIGN PATENT DOCUMENTS

| | | |
|---|---|---|
| EP | 3238565 A1 | 11/2017 |
| GB | 2519579 A | 4/2015 |
| GB | 2541416 | 2/2017 |
| GB | 2546192 | 7/2017 |
| WO | 2007112112 A1 | 10/2007 |
| WO | 2009/141489 A1 | 11/2009 |
| WO | 2009141489 A1 | 11/2009 |
| WO | 2010134050 A | 11/2010 |
| WO | 2011077282 A1 | 6/2011 |
| WO | 2012/020165 A1 | 2/2012 |
| WO | 2012020165 A1 | 2/2012 |
| WO | 2014036423 A | 3/2014 |
| WO | 2014202438 A1 | 12/2014 |
| WO | 2017/029469 A1 | 2/2017 |
| WO | 2017029469 A1 | 2/2017 |

OTHER PUBLICATIONS

International Search Report cited in PCT Application No. PCT/GB2016/050864 dated Aug. 9, 2016, 17 pages.
UK Search and Examination Report cited in Application No. GB1704063.5 dated May 9, 2017, 8 pages.
UK Examination Report cited in Application No. GB1704063.5 dated Jan. 2, 2018, 6 pages.
Third party observations cited in Application No. GB1704063.5 dated Aug. 4, 2017, 45 pages.
Screen captures from YouTube video clip entitled "Playbrush Story," 4 pages, uploaded on May 11, 2015 by user "mfischer". Retrieved from Internet: <http://www.youtube.com/watch?v=sgBnJz3iKQ>.
Third Party Observation filed with Intellectual Property Office of the United Kingdom, corresponding Great Britain application No. GB 2541416, filed Jan. 17, 2017.
Third Party Observation filed with European Patent Office, corresponding European patent application No. 16715039.0, filed Feb. 22, 2018.
Third Party Observation filed with European Patent Office, corresponding European patent application No. 16715039.0, filed Mar. 26, 2018. (first).
Third Party Observation filed with European Patent Office, corresponding European patent application No. 16715039.0, filed Mar. 26, 2018. (second).
Office Communication Under Section 74(A) issued by the Intellectual Property Office of the United Kingdom in corresponding Great Britain application No. GB 2541416 dated May 3, 2018.
Third Party Observation filed with European Patent Office, corresponding European patent application No. 16715039.0, filed Oct. 15, 2018.
Third Party Observation filed with European Patent Office, corresponding European patent application No. 16715039.0, filed Mar. 1, 2019.
Third Party Observation filed with European Patent Office, corresponding European patent application No. 16715039.0, filed May 8, 2019.

\* cited by examiner

FIG.9

| | | LOW BATTERY | CHARGED BATTERY |
|---|---|---|---|
| S70 | 1 TAP, STATUS = ON | 3 COLOURED BLINKS | 3 WHITE BLINKS |
| S71 | 1 TAP, STATUS=OFF | NO LIGHT EFFECT | NO LIGHT EFFECT |
| S72 | CONNECTED | COLOURED PULSE | WHITE PULSE |
| S73 | 2 TAPS, TURNING ON | GRADUALLY INCREASING COLOUR | GRADUALLY INCREASING WHITE |
| S74 | 2 TAPS, TURNING ON | GRADUALLY DECREASING COLOUR | GRADUALLY DECREASING WHITE |
| S75 | 1 TAP, LOADING | COLOURED LIGHT, 5 SEC | WHITE LIGHT, 5 SEC |
| S76 | DEVICE NAME CALLED | 3 COLOURED FLASHES | 3 WHITE FLASHES |

TOOTHBRUSH ORIENTATION SYSTEM

The invention generally relates to a system for determining the orientation of a toothbrush. It also relates to the structure of a sleeve for receiving a toothbrush.

Good all round oral hygiene is important to help prevent various oral diseases. It is therefore important that all areas of the mouth are brushed equally and for a reasonable amount of time. Since it is difficult for an individual to see how and where they are brushing their teeth, it is common for individuals to miss some areas of the mouth. To address this problem, a system may be used to monitor brushing techniques and provide feedback to a user related to brushing.

Previous attempts at monitoring brushing techniques have included attaching a motion sensor to a toothbrush which provides feedback to the user about where in the mouth they are brushing. Often, the motion sensor is permanently attached to the toothbrush, the motion sensor and toothbrush forming one complete unit. If either the toothbrush or the motion sensor stop functioning, the whole unit must be replaced which may be expensive. Where a motion sensor is provided separately from the toothbrush there is a need to provide a technique for permitting easy assembly and disassembly.

Current motion sensors are capable of determining changes in the position of the toothbrush in space. However, it has been found that feedback from these sensors can mean that certain areas of the mouth may be regularly missed if the sensor is unable to accurately identify them or distinguish them from other areas.

As a result, there is a need for a quick and reliable method of providing feedback from a motion sensor that can improve the effectiveness of brushing to ensure that different areas in the mouth are brushed evenly.

According to an aspect of the present invention there is provided a system for determining the orientation of a toothbrush comprising: an orientation sensor configured for attachment to a toothbrush; one or more processors configured to receive orientation information from the orientation sensor and to determine whether the sensor is in a first orientation or a second orientation; wherein the first orientation corresponds to use of the toothbrush on a surface of teeth on the left of a user's mouth, and wherein the second orientation corresponds to use of the toothbrush on a surface of teeth on the right of a user's mouth.

In this way, orientation data from the sensor can be used to determine whether the toothbrush is being used in the left or right of a user's mouth. It is important to make sure all areas of the mouth are brushed equally for good all round oral hygiene. The orientation data can be used to distinguish clearly between left and right portions of the mouth, and this may be used to provide the user with feedback relating to brushing. In certain embodiments the feedback may be used by the user to ensure that both halves of the mouth are brushed equally.

There may be a plane of symmetry defined with respect to the user's mouth. In the first orientation, an attached toothbrush may have a longitudinal axis which subtends an angle on a left side of the plane, and in the second orientation an attached toothbrush may have a longitudinal axis which subtends an angle on a right side of the plane. The left and right sides of the plane may correspond to left and right sides of the user's mouth.

It has been found that the use of these angles can accurately distinguish between brushing on the left and right of the user's mouth for a wide variety of brushing styles. For brushing on the left of the mouth, a right handed user will tend to orientate their hand so that the tip of the brush is on the front face of the left teeth. For brushing on the right of the mouth the user will tend to rotate their hand through nearly 180° in order to flip the orientation of the brush head. This action will tend to rotate the orientation sensor so that it passes through the vertical axis, with respect to the user's mouth.

The angle subtended on the left side of the plane of symmetry corresponding to the first orientation may be separated from the angle subtended on the right side of the plane of symmetry corresponding to the second orientation by substantially 180°.

The front left teeth and front right teeth may be on opposite sides of a plane of symmetry. When a user brushes the teeth on the left side of the mouth, they will typically hold the toothbrush in a substantially horizontal position with the tip of the toothbrush on the left side of the plane. When a user brushes the teeth on the right side of the mouth, they will typically hold the toothbrush in a substantially horizontal position with the tip of the toothbrush on the right side of the plane. The difference in angles between the first and second orientations will therefore be approximately 180°.

The one or more processors may be configured to determine whether the orientation sensor is in a third orientation or a fourth orientation, wherein the third orientation corresponds to use of the toothbrush on an upper surface of the bottom teeth of a user's mouth and wherein the fourth orientation corresponds to the use of the toothbrush on a lower surface of the top teeth of a user's mouth. The toothbrush may be moved from the third orientation to the fourth orientation by a rotation of approximately 180° about the longitudinal axis of the toothbrush.

For brushing the top surface of the bottom teeth of the mouth, a user will tend to orientate their hand so that the bristles of the brush are pointing downwards, holding the toothbrush in a substantially horizontal orientation. For brushing the bottom surface of the top teeth of the mouth, a user will tend to orientate their hand so that the bristles of the brush are pointing upwards, holding the toothbrush in a substantially horizontal orientation. To switch between brushing the top and bottom teeth the user will tend to rotate their hand through nearly 180° in order to rotate the orientation of the toothbrush. This action will tend to rotate the orientation sensor about the longitudinal axis of the toothbrush.

The one or more processors may be configured to determine whether the orientation sensor is in a fifth or sixth orientation, wherein the fifth orientation corresponds to use of the toothbrush on an inside surface of the top teeth of a user's mouth, and wherein the sixth orientation corresponds to the use of the toothbrush on an inside surface of the bottom teeth of a user's mouth.

A horizontal plane may be defined with respect to the user's mouth. In the fifth orientation, an attached toothbrush may have a longitudinal axis which subtends a first angle on an upper side of the horizontal plane, and in the sixth orientation an attached toothbrush may have a longitudinal axis which subtends a second angle on a lower side of the horizontal plane, corresponding to the top and bottom of a user's mouth respectively.

These angles can accurately distinguish between brushing the inside of the top and bottom teeth of the user's mouth for a wide variety of brushing styles. For brushing the inside top teeth of the mouth, a user will tend to orientate their hand so that the bristles of the brush are on the inner face of the top teeth with the tip of the brush in the upper portion of the mouth. For brushing the inside lower teeth of the mouth, a user will tend to orientate their hand so that the bristles of the brush are on the inner face of the bottom teeth with the tip of the brush in the lower portion of the mouth. To switch between brushing the inner surfaces of the top and bottom teeth the user will tend to rotate their hand in order to flip the orientation of the toothbrush. This action will tend to rotate the orientation sensor so that it passes through a horizontal axis, defined with respect to the user's mouth.

The orientation sensor may comprise an accelerometer. The one or more processors may be configured to determine the directional pull of gravity using information received from the accelerometer. This may be used by the processors to determine the orientation of the attached toothbrush in space.

The direction of gravity may be used as an initialisation value to determine the orientation of the toothbrush in space. Thus, the toothbrush does not need to be in a particular orientation in space before the user can start brushing their teeth. When a user moves the toothbrush from the start orientation to a first orientation, the change in the directional pull of gravity can be determined. The processors may then be able to determine the first orientation of the toothbrush based on this change in direction of gravity and the initial orientation of the toothbrush.

The orientation sensor may be detachably coupled to the toothbrush. In this way, the same orientation sensor may be used with a variety of toothbrushes. In some embodiments, there may be a housing unit which houses the orientation sensor and which detachably couples the orientation sensor to the toothbrush.

The orientation sensor may be coupled to the toothbrush in a unique configuration relative to the toothbrush. In this way, the one or more processors may be able to determine the orientation of the attached toothbrush if the orientation of the toothbrush relative to the orientation sensor is known. In some embodiments a housing unit is provided to house the orientation sensor and the housing unit may have a mark on it to indicate the front face of the housing unit. A user may then be required to line up the mark on the housing unit with the front face of the toothbrush when coupling the orientation sensor to the toothbrush. In some embodiments, a mark on the housing unit and the bristles of the toothbrush must be facing the same direction when being coupled together.

The determination of the first orientation and second orientation by the one or more processors may be used as inputs to control a game on an electronic computing device.

The determination of the toothbrush in a particular orientation can be used as an input for a game and provide a visual representation of the orientation of the toothbrush. In some embodiments the visual representation can be used to provide real time feedback relating to brushing. The feedback may be used by the user to ensure that first and second parts of the mouth are brushed equally. In some embodiments the game control inputs can be extended to include some or all of the third, fourth, fifth, and sixth orientations. In some embodiments, orientation information may be analysed and the game may reward the user if different areas of the mouth are brushed equally. In some embodiments, the game may display toothbrush orientations for the user to imitate.

The one or more processors may be configured to determine a unique maximum and minimum threshold value for each of the first and second orientations of the toothbrush.

The threshold values may be unique to a particular user. Since different users do not move the brush in exactly the same way, a first user moving the toothbrush from a first orientation to a second orientation may use different motions to a second user moving the toothbrush from a first orientation to a second orientation. The toothbrush system may determine maximum and minimum limits for different users so it is able to distinguish between the motions of a first and second user.

The one or more processors may be configured to store, and later recall, the maximum and minimum threshold values associated with a particular user, In this way, the game may adapt and the visual effects may be adjusted according to the unique style of the particular user.

According to an aspect of the present invention there is provided a method of determining the orientation of a toothbrush comprising: attaching an orientation sensor to a toothbrush; configuring one or more processors to receive orientation information from the orientation sensor and determining whether the sensor is in a first orientation or a second orientation; wherein the first orientation corresponds to use of the toothbrush on a surface of teeth on the left of a user's mouth, and wherein the second orientation corresponds to use of the toothbrush on a surface of teeth on the right of a user's mouth.

According to a further aspect of the present invention there is provided a toothbrush holder comprising: a sleeve for accommodating a toothbrush having a relatively narrow upper end and a relatively broad lower end, wherein the sleeve has a shape that is flared outwardly between the upper and lower ends; and a base for supporting the sleeve in a vertical orientation; wherein the lower end of the sleeve comprises an elastic inner wall and an outer wall which are spaced apart to allow the elastic inner wall to flex toward the outer wall.

Spacing the elastic inner wall apart from the external wall creates a gap between the two components. The gap, surrounding a portion of the flexible sleeve, allows for greater flexibility at the thicker end of the sleeve, which would otherwise be relatively rigid. This makes it easier for the user to insert and remove a toothbrush from the toothbrush holder, while allowing the toothbrush holder to have a broad base that can effectively support the toothbrush holder and an attached toothbrush in a vertical orientation.

The internal and external wall may form part of a single continuous structure. In some embodiments the internal wall is a continuation of the external wall structure surrounding the neck, while the external wall surrounding the internal wall is part of a second structure.

The toothbrush holder may further comprise a base and a fluid tight internal casing. The fluid tight internal casing may be used to house an orientation sensor. The fluid tight internal casing may be placed between one end of the sleeve and the base.

This configuration helps to ensure that the weight of toothbrush holder is focussed at one end. The weight will be concentrated at the bottom end of the toothbrush holder. The internal casing may be used to house components that need to be protected against water damage. The internal casing may be used to house a variety of electrical components. In some embodiments the internal casing may house a charging port.

The fluid tight internal casing may house at least one LED light. The LED light may be configured to transition from a first state to a second state in response to an input from the user. In this way, light may be used to indicate the status of the toothbrush orientation system to the user. The light may be coloured or white. The status of the toothbrush system may be indicated using predefined light effects which may include, but are not limited to, pulses, blinks, flashes, fading lights, or any combination of effects. A part of the internal casing may be constructed from a material which permits light to pass. A part of the toothbrush holder may be constructed from a material which allows light to pass through.

The base of the toothbrush holder may be a substantially perpendicular to the longitudinal axis of the sleeve.

When a toothbrush has been inserted into the flexible sleeve, the longitudinal axis of the toothbrush will be parallel to the longitudinal axis of the flexible sleeve. The base of the toothbrush holder will be perpendicular to the longitudinal axis of the toothbrush and the flexible sleeve. The toothbrush holder can be used as a holder for a toothbrush when the toothbrush is not being used.

Embodiments of the present invention will now be described, by way of example only, with reference to the accompanying drawings, in which:

FIG. 9 is a table illustrating the commands of an LED light system for indicating the status of a toothbrush.

Figure 1:
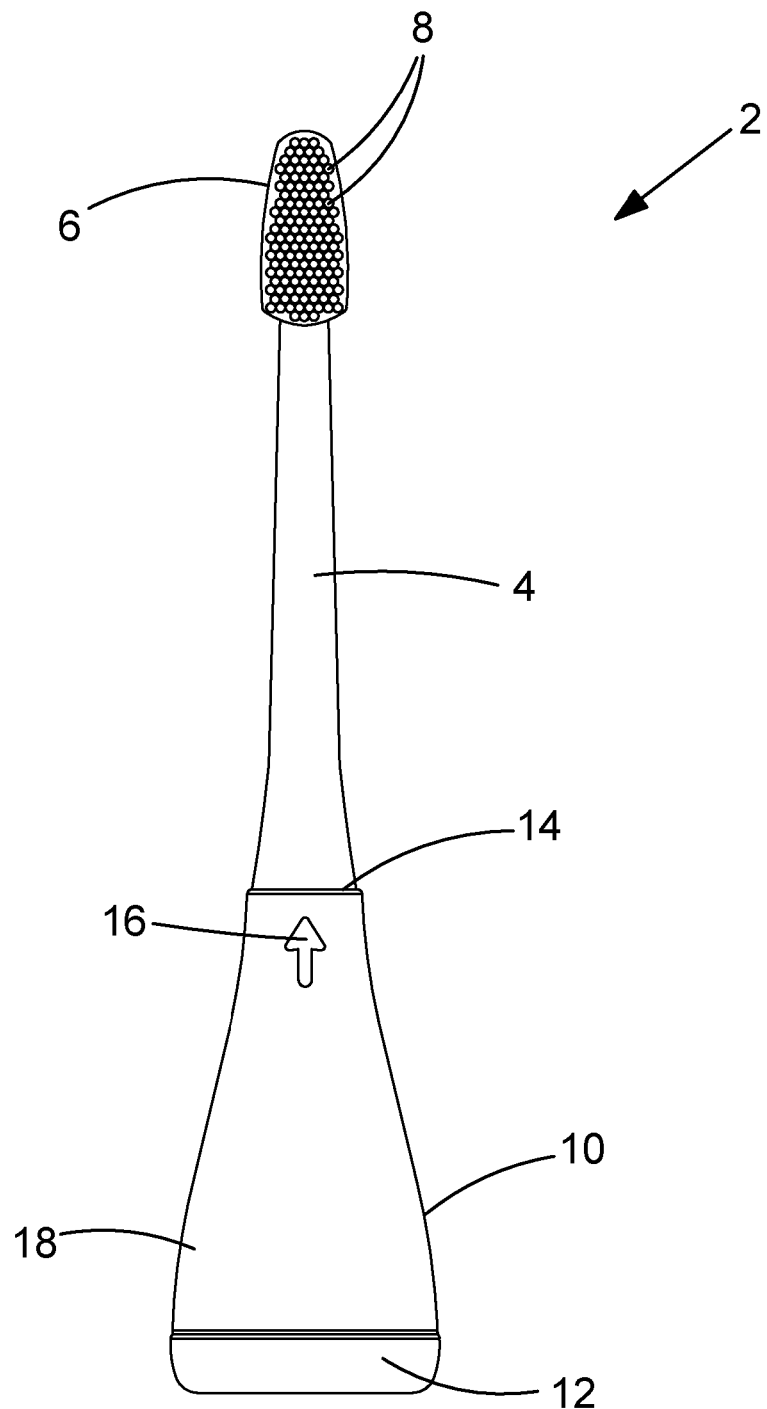
FIG. 1 is a front view of a toothbrush in a toothbrush holder.

FIG. 1 shows a toothbrush 4 connected to a toothbrush holder 10. The toothbrush holder 10 comprises a thermoplastic elastomer external wall 18 and has a generally frustoconical shape.

At one end of the toothbrush holder 10 is a neck 14 and at the opposite end is a base 12. The diameter of the neck 14 is chosen so that the toothbrush 4 can be inserted into the neck 14 and, once inserted, there will be a snug fit between the neck 14 and the toothbrush 4. This will prevent the toothbrush 4 moving laterally relative to the neck 14, ensuring that the toothbrush holder 10 is securely coupled to the toothbrush 4. The base 12 of the toothbrush holder 10 extends further in a radial direction than the neck 14 of the toothbrush holder 10. This creates a wide base 12 on which the toothbrush holder 10 can stand.

Figure 2:
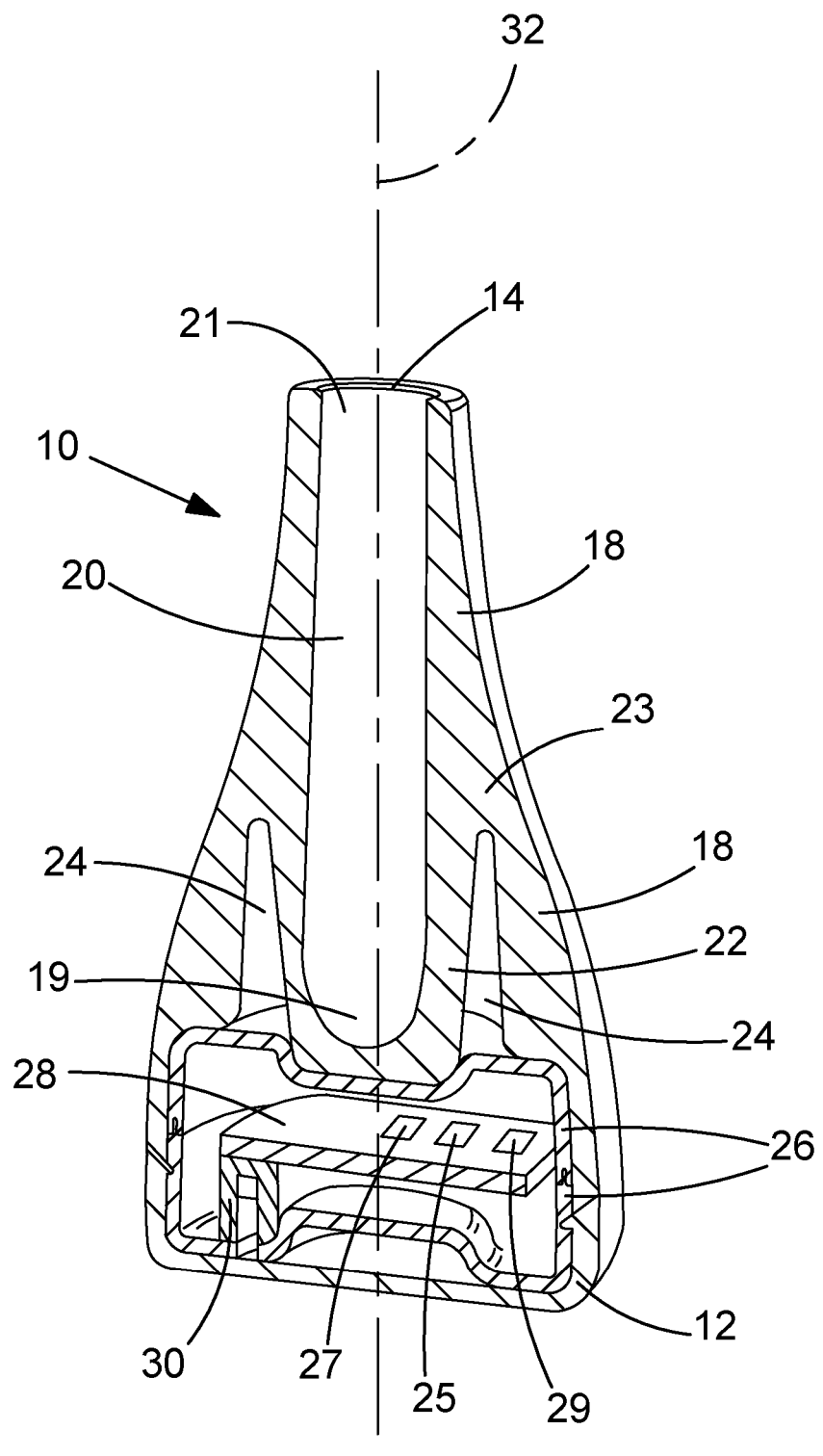
FIG. 2 is a cross sectional view of a toothbrush holder for housing a toothbrush.

FIG. 2 shows a cross sectional view of the toothbrush holder 10. Here, the flared nature of the external wall 18 can be seen more clearly. Extending from the neck 14, towards the base 12, is a flexible sleeve 20. The flexible sleeve 20 has a generally cylindrical shape with a closed end 19 opposite an opening 21 at the neck end 14 of the toothbrush holder 10. The flexible sleeve 20 is surrounded by external wall 18. After the toothbrush 4 has been inserted into the neck 14, it is further inserted into the flexible sleeve 20. The diameter of the flexible sleeve 20 is chosen so that lateral movement of the toothbrush 4 relative to the flexible sleeve 20 is generally prevented, ensuring a secure coupling between the flexible sleeve 20 and toothbrush 4.

The closed end 19 of the flexible sleeve 20 is further surrounded by an internal wall 22. The internal wall 22 and external wall 18 are spaced apart from each other creating a gap 24 between the two walls. Internal wall 22 is made from a flexible material, for example a thermoplastic elastomer, allowing the internal wall 22 to move laterally with respect to the external wall 18. The space 24 created between the two walls surrounds the closed end 19 of the flexible sleeve 20. This allows the internal wall 22 to move in any radial direction. Towards the neck 14, the internal wall 22 and external wall 18 come together at shoulder 23 to form a continuous unit. The internal wall 22 branches off from the external wall 18 at shoulder 23 so the toothbrush holder 10 is formed from one unit.

Beneath the flexible sleeve 20, between the closed end 19 and the base 12, is an internal casing 26. The internal casing 26 is made from a non-flexible material and houses a printed circuit board (PCB) 28. The PCB 28 comprises a Bluetooth Low Energy (Bluetooth 4.0/Bluetooth Smart) module 25 and an accelerometer 27. The accelerometer 27 can be coupled to the toothbrush 4 via internal casing 26 within the toothbrush holder 10. A charging circuit (not shown), charging inductor ring (not shown) and Micro-USB charging station 30 are also contained within the internal casing 26.

Figure 2A:
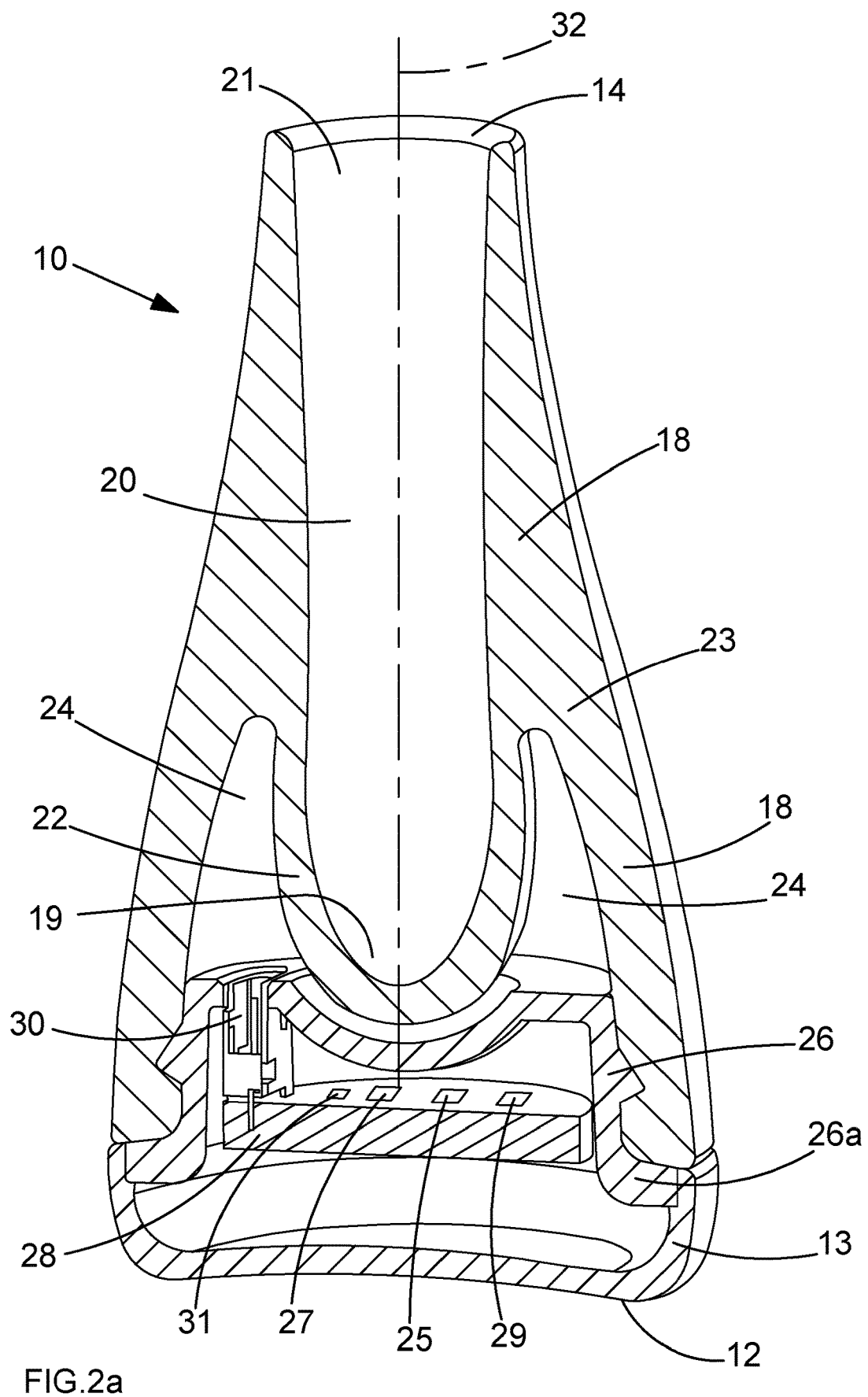
FIG. 2a is a cross sectional view of an alternative embodiment of a toothbrush holder.

FIG. 2a shows a cross sectional view of an alternative embodiment of the toothbrush holder 10. In this embodiment, the internal casing 26 is formed from a first top piece 26a located within the external wall 18 of the toothbrush holder 10, and a second bottom piece 13 located outside the external wall 18 of the toothbrush holder 10. The two pieces 26a, 13 join together via a snap-on connection, sealing the internal casing 26. The second piece 13 of the internal casing also forms the base 12 of the toothbrush holder 10. The internal casing 26 also comprises an annular protrusion that is arranged to snap into a corresponding annular recess in the wall 18.

Figure 7:
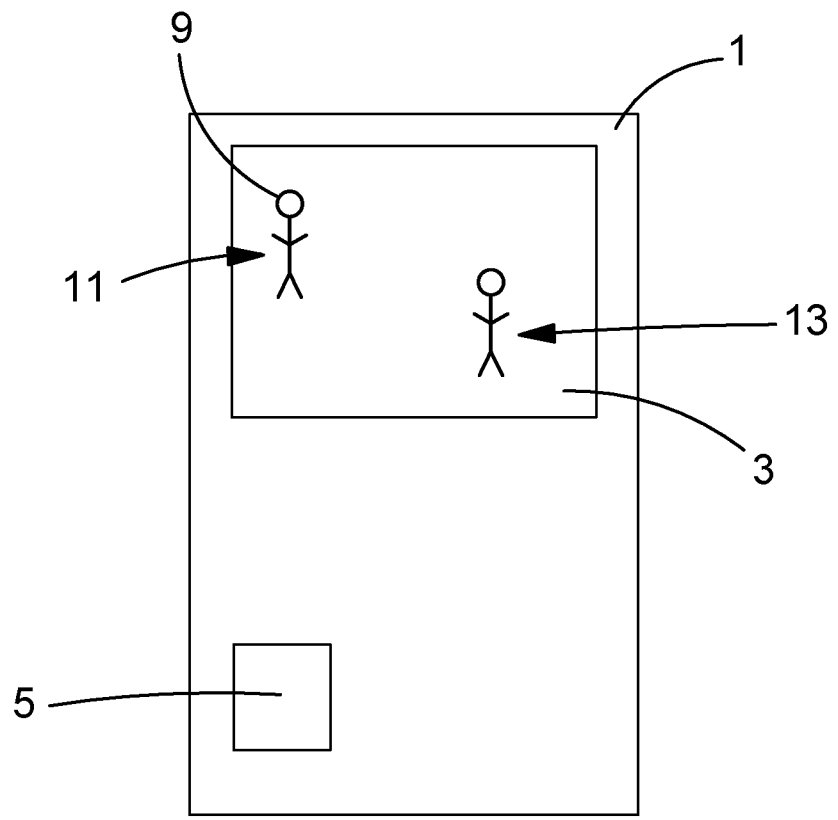
FIG. 7 is a schematic diagram of a mobile device.

When a user is brushing their teeth, raw accelerometer data is transmitted from the accelerometer 27 via radio frequency (e.g. Bluetooth) to a mobile device 1 (e.g. smartphone or tablet), illustrated in FIG. 7. An application running on the mobile device 1 receives the raw sensory data which is fed into an algorithm. Processors 29 then compute the orientation of the toothbrush 4 and the part of the mouth being brushed. A more detailed description of how the orientation of the toothbrush 4 is determined will be provided later.

The base 12 of the toothbrush holder 10 has a generally featureless outer surface. This creates a generally smooth, flat outer surface providing a stable base for the toothbrush holder 10 to stand on. The base 12 is perpendicular to the longitudinal axis 32 of the flexible sleeve 20 helping the toothbrush holder 10 remain stable, even when a toothbrush 4 is inserted. The toothbrush holder 10 can be used to store the toothbrush in an upright position while the toothbrush 4 is not in use.

Figure 1A:
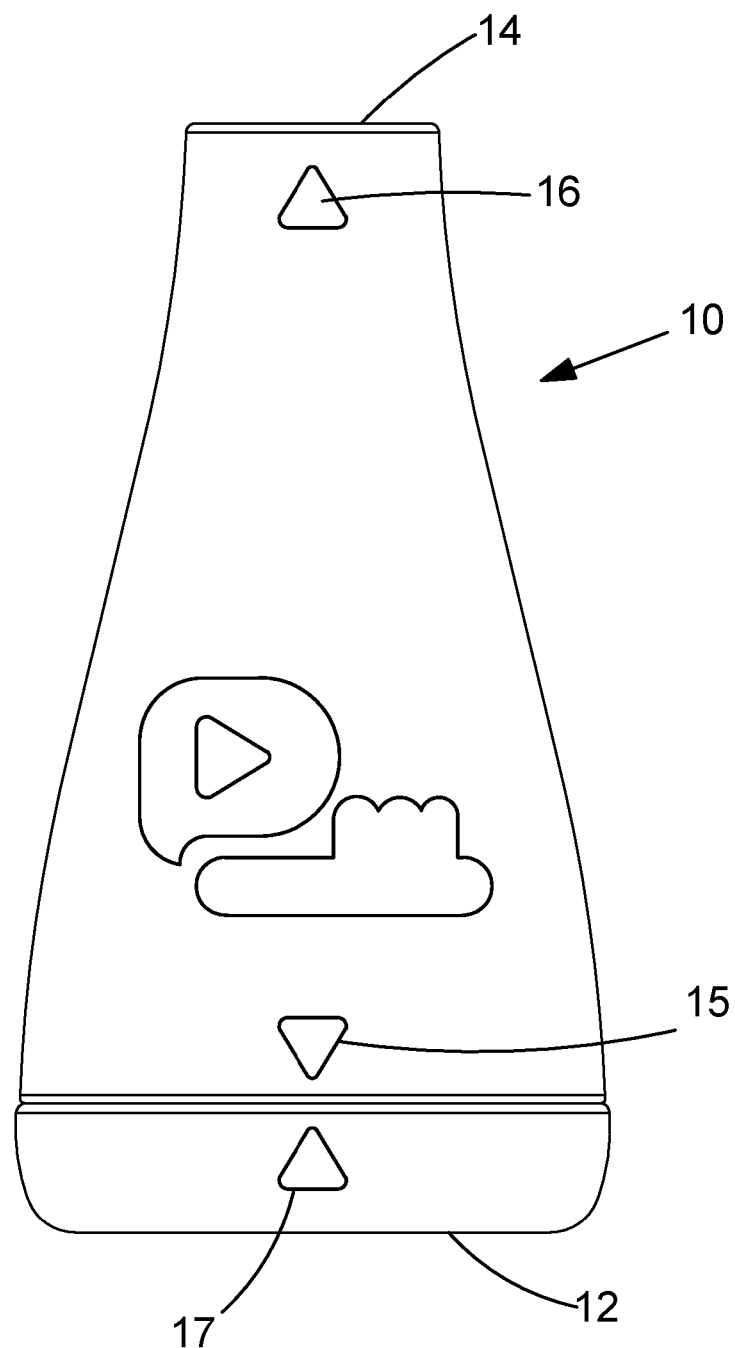
FIG. 1a is a front view of an alternative embodiment of a toothbrush holder.

The user assembles the system 2, by coupling the toothbrush 4 to the toothbrush holder 10. A marker 16 is provided on the outer surface of the toothbrush holder 10 to help the user insert the toothbrush 4 correctly. The marker 16 and the bristles 8 of the toothbrush 4 must line up along the same vertical axis, the vertical axis passing through the centre of the marker 16 and through the centre of the toothbrush bristles 8. The bristles 8 and the marker 16 must also be facing the same radial direction. An alternative embodiment of a toothbrush holder 10 is shown in FIG. 1a. An additional marker 15 is provided on the outer surface of the toothbrush holder 10, and a marker is provided on the outer surface of the internal casing 26. These markers help the user connect the toothbrush holder 10 to the internal casing 26. The second marker 15 on the toothbrush holder 10 and the marker 17 on the internal casing 26 must line up along the same vertical axis. All three markers 15, 16, 17, and the toothbrush bristles 8 may line up along the same vertical axis. Alternatively, the first marker 16 and toothbrush bristles 8 may line up along a different vertical axis to the second marker 15 and the internal casing marker 17.

Information from the accelerometer 27 is sent to the processors 29 which are configured to determine the directional pull of gravity. This information can be used to determine the orientation of the toothbrush 4 in space. The processor 29 can then determine the initial orientation of the accelerometer 27, and therefore also the initial orientation of the toothbrush 4, based on the orientation relationship between the toothbrush 4 and the accelerometer 27. The initial direction of gravity is used as an initialisation value, from which all other orientations are determined, based on changes in accelerometer data.

Before the user uses the system 2 for brushing their teeth, the system 2 should be calibrated for that particular user. Calibration is done during the training phase, the process of which will be described with reference to FIG. 6. During the training phase, the user is guided through brushing different parts of the mouth with the aim of covering all positions that the user might be in whilst brushing their teeth (eg standing upright, leaning forwards over a basin), and different speeds (intensities) of brushing.

To aid this process, the mouth can be split up into six identifiable areas: front surface of left teeth, front surface of right teeth, top surface of bottom teeth, bottom surface of top teeth, inside surface of top teeth, inside surface of bottom teeth.

Figure 6:
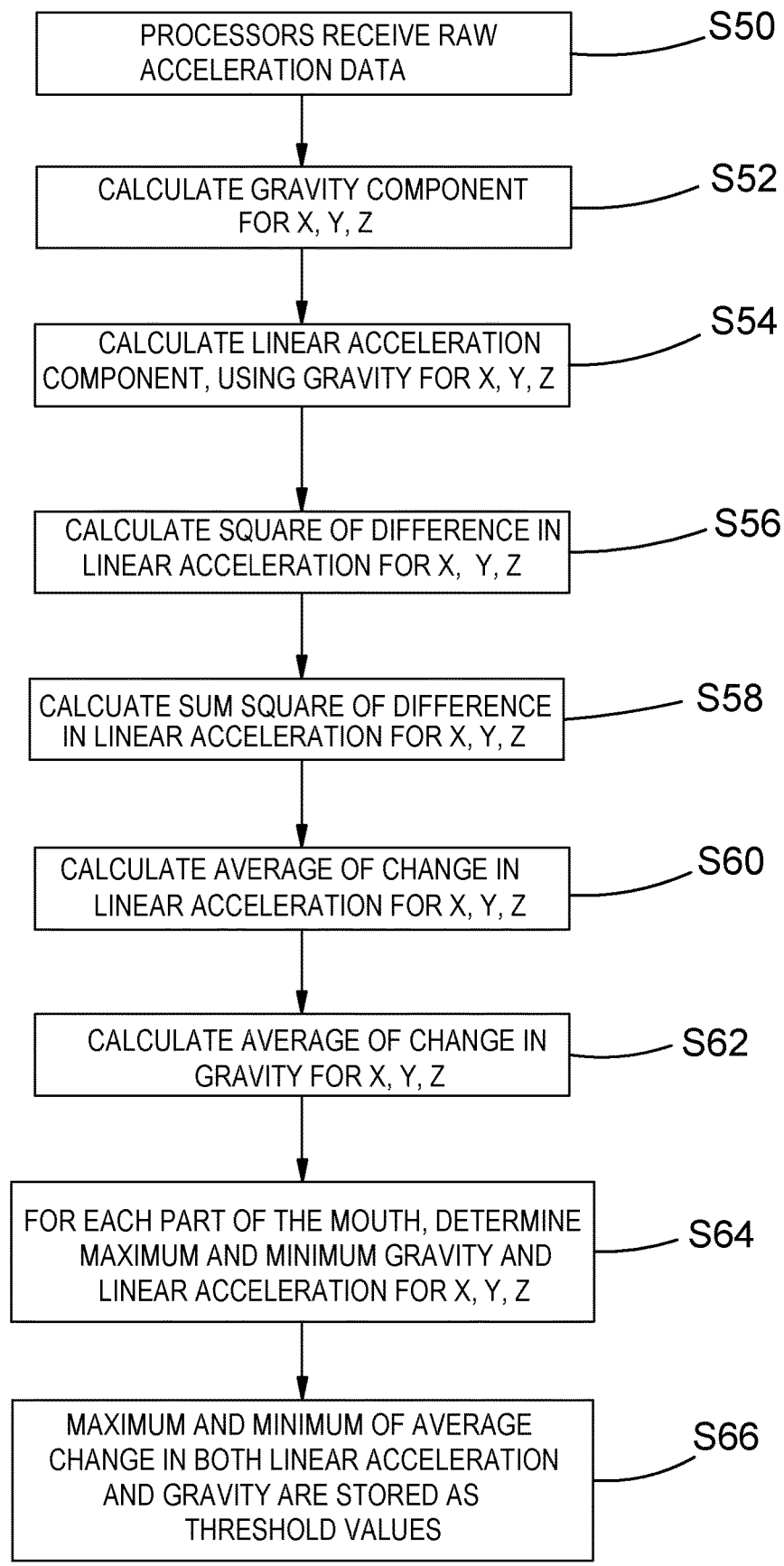
FIG. 6 is a flow chart illustrating a toothbrush orientation calibration process.

During the training phase, raw byte data from the accelerometer 27 is received by the processors 29 and converted to floating point numbers in x, y, and z directions, step S50 in FIG. 6. Data is recorded in multiples of the Earth's gravity, g. Two components of acceleration information in each axis direction are calculated from the raw accelerometer data: gravity and linear acceleration. Gravity is used to help determine the orientation of the toothbrush 4 and linear acceleration is used to help determine the brushing pattern.

The gravity component is isolated from the accelerometer, S52, data by low-pass filtering the accelerometer data using the following formula:

$$g_{x,new} = \text{coeff} \cdot g_{x,old} + (1-\text{coeff})\text{accel}_x, \quad (1)$$

where $g_{x,new}$ is the newly calculated x component of gravity, $g_{x,old}$ is the previous value of the x component of gravity, $\text{accel}_x$ is the current value of the acceleration in the x direction, and coeff is the filter coefficient.

The filter coefficient is given by $$\text{coeff} = \frac{T}{T + \Delta t}, \quad (2)$$

where T is the filter time constant, and $\Delta t$ is the sample update time. Using a filter time constant of 0.4 s and sample update of 0.1 s gives a filter coefficient of 0.8.

Gravity components in the y and z directions can be calculated in a similar way.

The linear acceleration component is calculated by subtracting the gravity component from the acceleration data, S54, giving $$\text{linear}_x = \text{accel}_x - g_{x,new}, \quad (3)$$

where $\text{linear}_x$ is the x component of linear acceleration. The linear acceleration in the y and z directions can be calculated in a similar way.

In addition to computing the gravity and linear acceleration, the square of differences between consecutive samples of linear acceleration in each of the x, y, and z directions is calculated, S56. The sum of the square of the difference between consecutive samples of linear acceleration in the x, y, and z direction is also calculated, S58, to determine whether the user is brushing or not.

The averages of the change in linear acceleration and the averages of the change in gravity are calculated in each direction during steps S60 and S62 respectively.

Once data has been collected, for each area of the mouth and each component of acceleration a maximum and minimum value is determined during step S64. For a particular part of the mouth (eg front surface of left teeth), the algorithm iterates through all of the 12 constraints; the gravity component and linear acceleration component each have a maximum and minimum value associated with it in each of the three x, y, and z directions. Throughout the training process the maximum and minimum of the average of the change in linear acceleration, and the average of the change in gravity in each direction are stored and used as thresholds, S66, for predicting the orientation of the toothbrush 4 later on.

Once calibration is complete, the user is able to brush their teeth freely and the processors 29 will determine which area of the mouth is being brushed, based on the orientation of the toothbrush 4. As the user brushes their teeth, data from the accelerometer 27 is processed and the resulting data is compared with the thresholds obtained during the training phase for each area of the mouth. If the gravity component and linear acceleration component both fall within the maximum and minimum values of a particular area of the mouth, the processors 29 will determine that the toothbrush 4 is in an orientation corresponding to that location. The processor 29 will then output the area of the mouth being brushed.

If the user has never used the training algorithm, the resulting data is compared with a sample data set of threshold values. The user can overwrite the pre-stored sample data set thresholds at any time by completing the training phase.

FIG. 3 illustrates the first 41 and second 33 orientations of the toothbrush 4 corresponding to the front surface of the left 42 and right 40 teeth respectively. A plane of symmetry 36 can be defined with respect to the user's mouth 34. This plane 36 divides the mouth 34 in half, each half representing the left side and right side of the mouth 34.

Figure 3A:
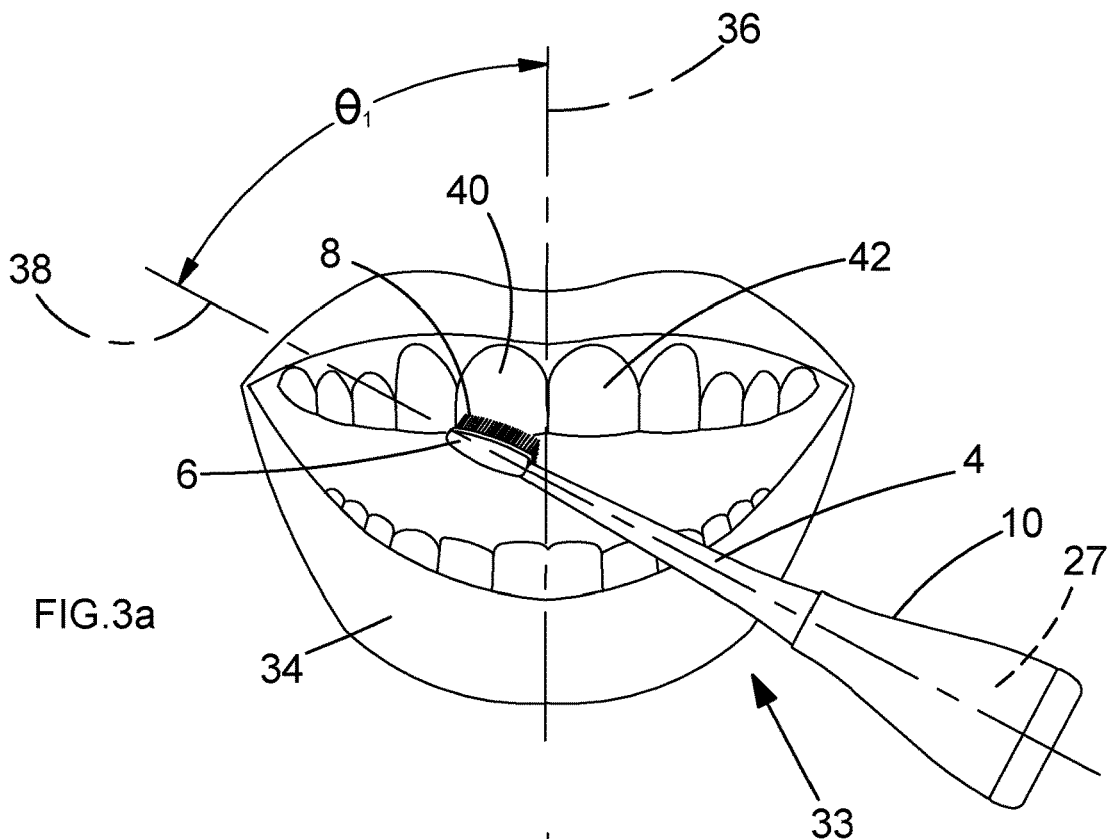
FIGS. 3a-3b are schematic diagrams of a first and second orientation of a toothbrush.
Figure 3B:
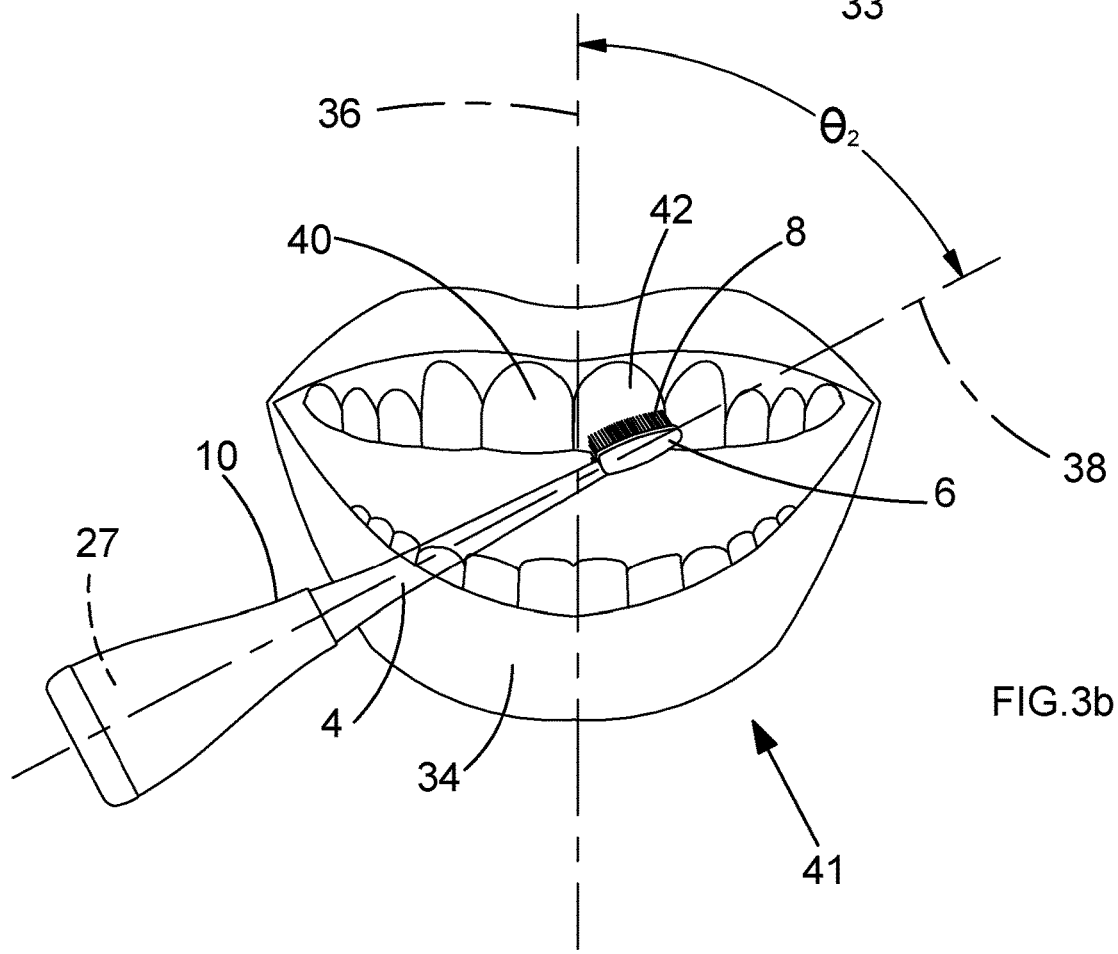

When a right handed user brushes their teeth on the left of their mouth (as illustrated by FIG. 3b), they will tend to orientate the toothbrush 4 so that the tip 6 of the brush 4 is on the left side of the plane of symmetry 36, and the bristles 8 of the brush 4 are touching the front surface of the teeth 42 on the left side of the mouth 34. In this position the longitudinal axis 38 of the toothbrush 4 will make a first angle $\theta_1$ with the plane of symmetry 36.

To brush the right side of their mouth (as illustrated in FIG. 3a), the user will tend to rotate their hand through nearly 180°, flipping the orientation of the toothbrush 4 so that the tip 6 of the toothbrush 4 is now on the right side of the plane of symmetry 36, and the bristles 8 are touching the front surface of the teeth on the right 40. This motion will generally rotate the accelerometer 27 so that it passes through the plane of symmetry 36. The longitudinal axis 38 of the toothbrush 4 will now make a second angle $\theta_2$ with the plane of symmetry 36.

Different users will tend to hold the toothbrush slightly differently from each other. There will therefore be a wide variety of brushing styles for each orientation. The difference between $\theta_1$ and $\theta_2$ will be different for different users. Some users will hold the toothbrush 4 substantially horizontal with respect to the user's mouth 34, in each of the first 41 and second 33 orientations. In this instance, $\theta_1$ and $\theta_2$ will be separated by approximately 180°.

FIG. 4 illustrates the third 43 and fourth 45 orientations of the toothbrush 4 corresponding to the top surface of the bottom teeth 46 and bottom surface of the top teeth 44 respectively.

Figure 4A:
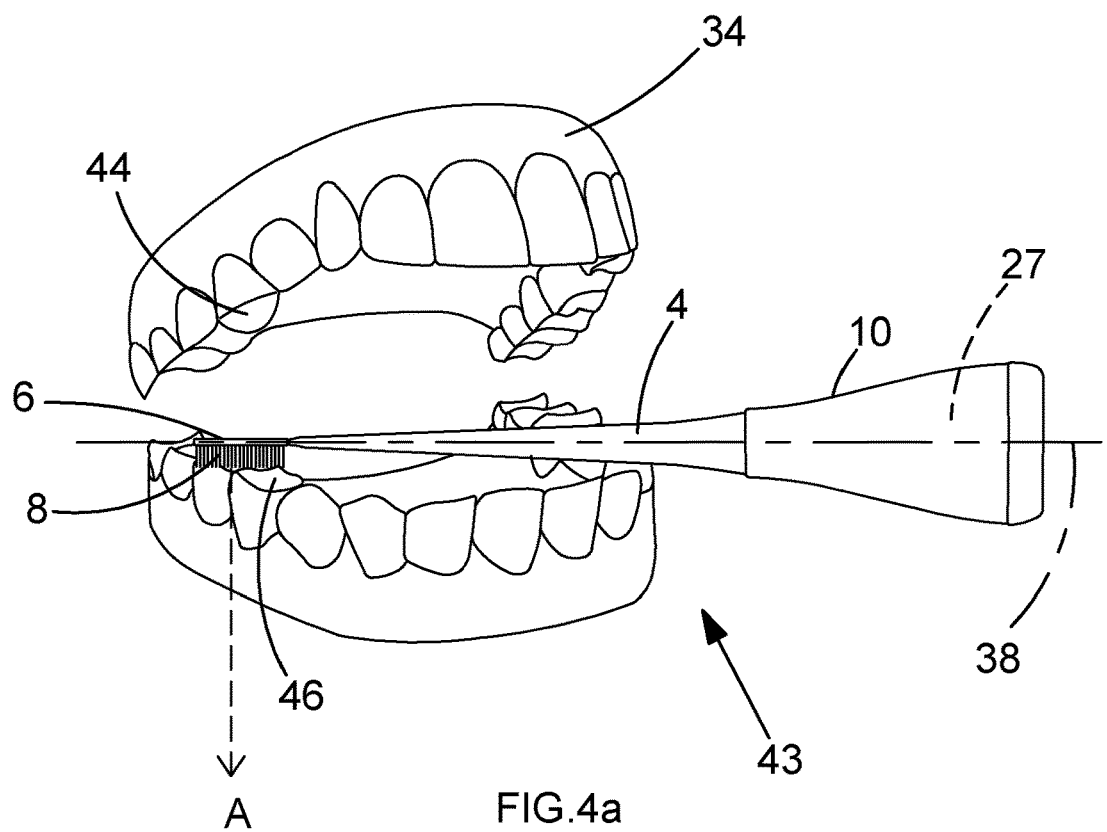
FIGS. 4a-4b are schematic diagrams of a third and fourth orientation of a toothbrush.

When the user brushes the top surface of the bottom teeth 46 (as illustrated by FIG. 4a), they will tend to orientate the toothbrush 4 so that the bristles 8 of the brush 4 are touching the upper surface of the bottom teeth 46, and are generally parallel to direction 'A' along the plane of symmetry 36. This orientation will be substantially similar for the top surface of the bottom teeth on the left and right sides of the mouth 34.

Figure 4B:
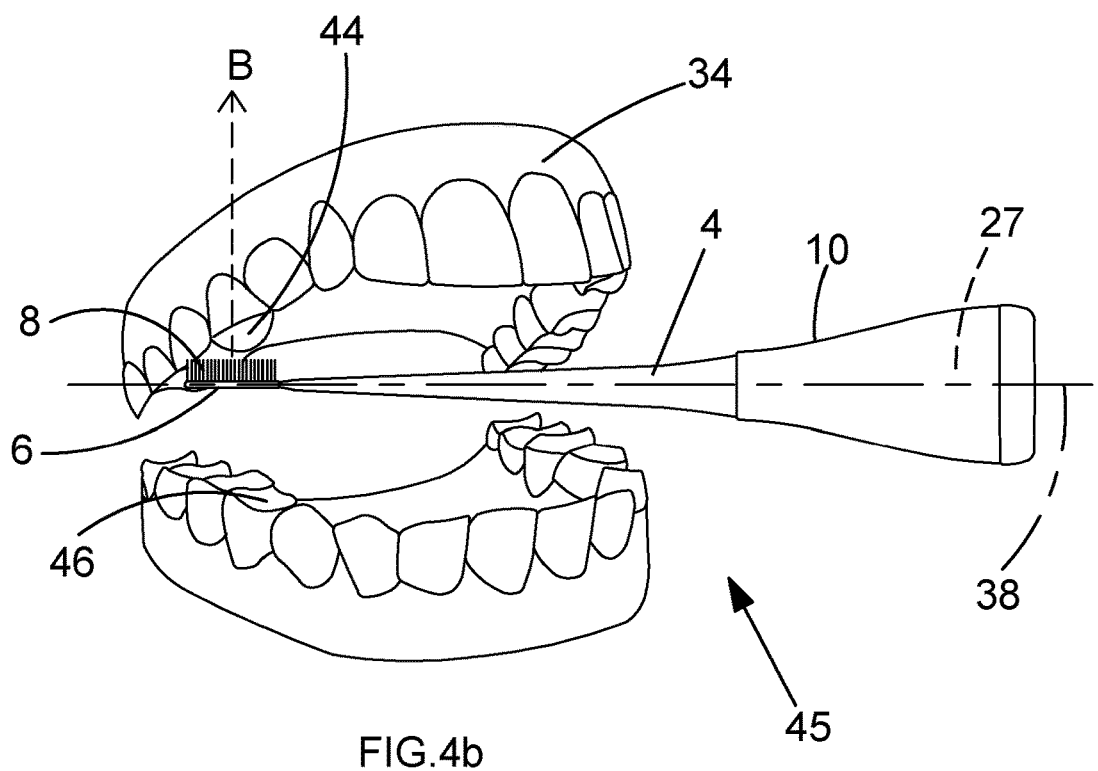

To brush the bottom surface of the top teeth 44 (as illustrated by FIG. 4b), the user will tend to rotate their hand through nearly 180°, turning the orientation of the toothbrush 4 so that the bristles 8 are touching the bottom surface of the top teeth 44, and are generally parallel to direction 'B' along the plane of symmetry 36. This motion will generally rotate the accelerometer 27 about the longitudinal axis 38 of the toothbrush 4. This orientation will be substantially similar for the bottom surface of the top teeth on the left and right sides of the mouth.

In each of the third 43 and fourth 45 orientations, the user will hold the toothbrush 4 so that the bristles 8 are generally aligned along a vertical axis with respect to the user's mouth 34 so directions 'A' and 'B' will be separated by approximately 180°.

FIG. 5 illustrates the fifth 47 and sixth 49 orientations of the toothbrush 4 corresponding to the inside surface of the top 50 and bottom 52 teeth respectively. A horizontal plane 48 can be defined with respect to the user's mouth 34. This plane 48 divides the mouth 34 in half, each half representing the top and bottom of the mouth 34.

Figure 5A:
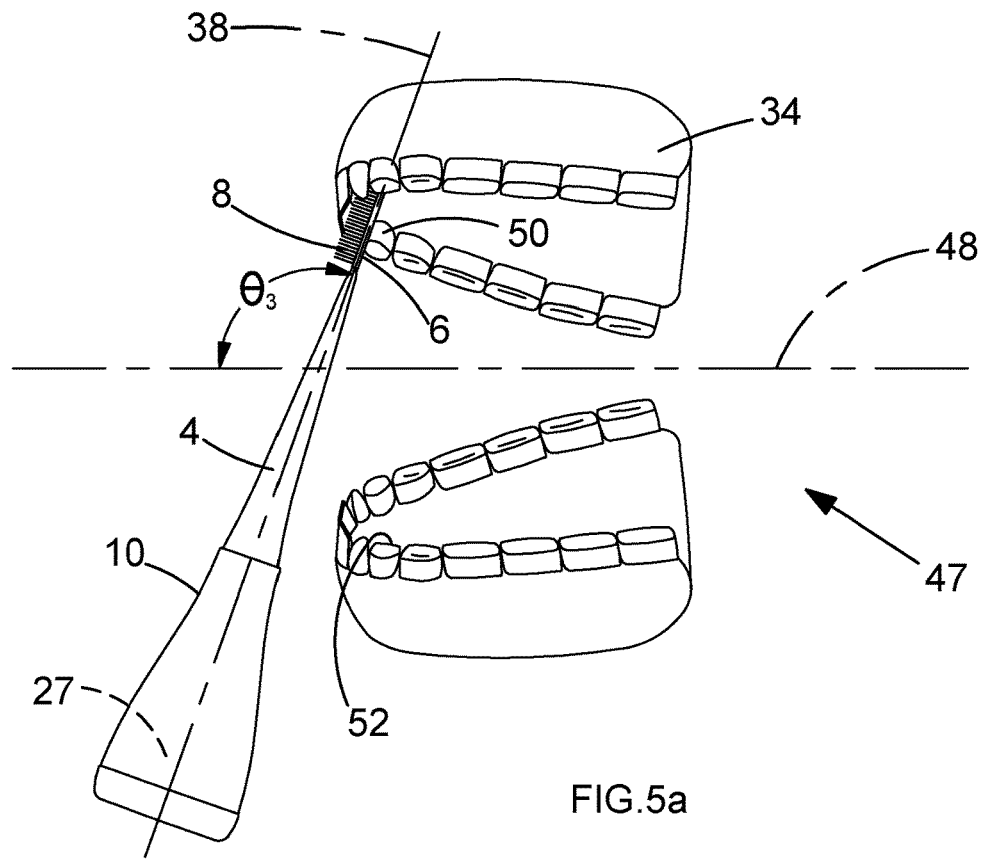
FIGS. 5a-5b are schematic diagrams of a fifth and sixth orientation of a toothbrush.

When the user brushes the inside of the teeth on the top 50 of their mouth (as illustrated by FIG. 5a), they will tend to orientate the toothbrush 4 so that the tip 6 of the brush is on the upper side of the horizontal plane 48, and the bristles 8 of the brush 4 are touching the inside surface of the teeth on the top 50 of the mouth 34. In this position the longitudinal axis 38 of the toothbrush 4 will make an angle $\theta_3$ with the horizontal plane 48.

Figure 5B:
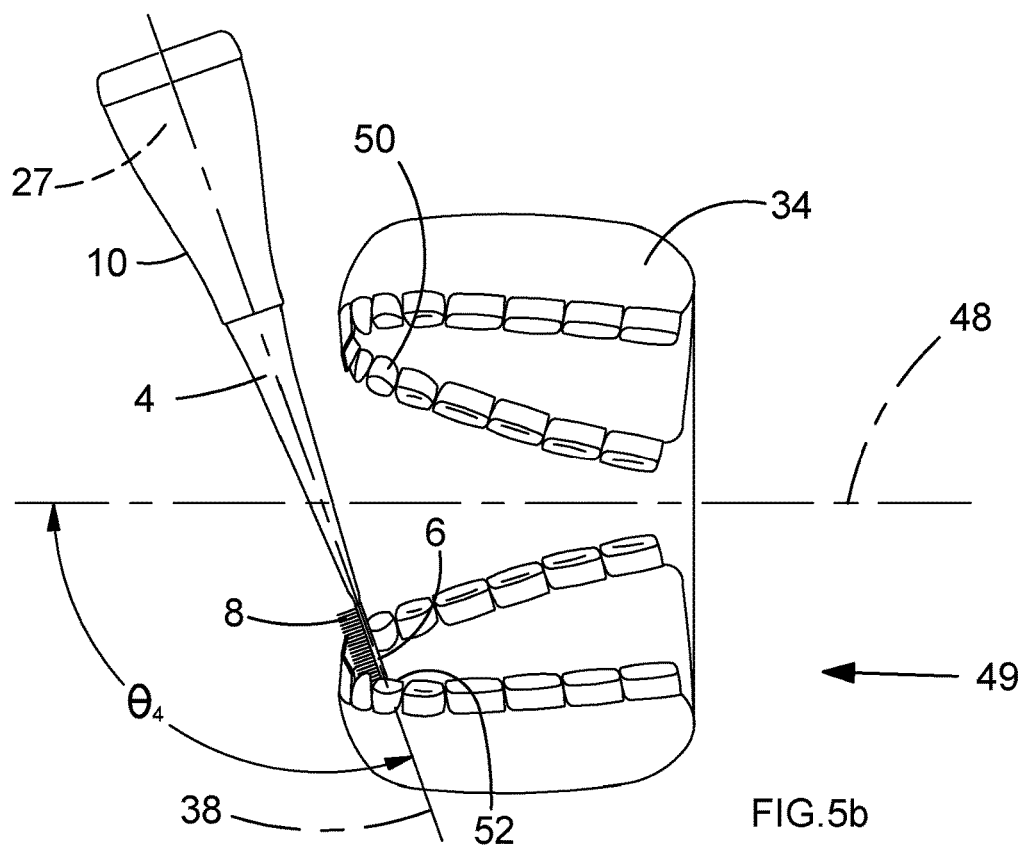

To brush the inside surface of the bottom teeth 52 of the mouth (as illustrated in FIG. 5b), the user will tend to rotate their hand, flipping the orientation of the toothbrush 4 so that the tip 6 of the toothbrush 4 is now on the lower side of the horizontal plane 48, and the bristles 8 are touching the inside surface of the bottom teeth 52. This motion will generally rotate the accelerometer 27 so that it passes through the horizontal plane 48. The longitudinal axis 38 of the toothbrush 4 will now make an angle $\theta_4$ with the horizontal plane 48.

As mentioned previously, different users will tend to hold the toothbrush slightly differently from each other giving rise to a wide variety of brushing styles. The difference between $\theta_3$ and $\theta_4$ will be different for different users. Some users will hold the toothbrush 4 substantially vertical with respect to the user's mouth 34, in each of the fifth 47 and sixth 49 orientations. In this instance, $\theta_3$ and $\theta_4$ will be separated by approximately 180°.

The determination of the toothbrush orientations by the processors 29 can be used as inputs to control a game on a mobile device 1, turning the toothbrush 4 into a game controller. This provides visual feedback to the user, via the display screen 3 of the mobile device 1, about the orientation of their toothbrush 4.

A software application run on the mobile device 1 is configured to translate specific brushing motions into motions of an object 9 within the game. The position of the object 9 in the game has a one to one correlation with the orientation of the toothbrush 4 in space. Changes in the orientation of the toothbrush 4 directly correspond to changes in the position of the object 9 in the game.

The object 9 in the game is used to navigate a level and collect rewards. The software application measures and records in-game performance and relates it to brushing techniques. The game helps users to brush teeth regularly and to take care to brush all areas of the mouth equally by encouraging users to beat previous scores.

Figure 8A:
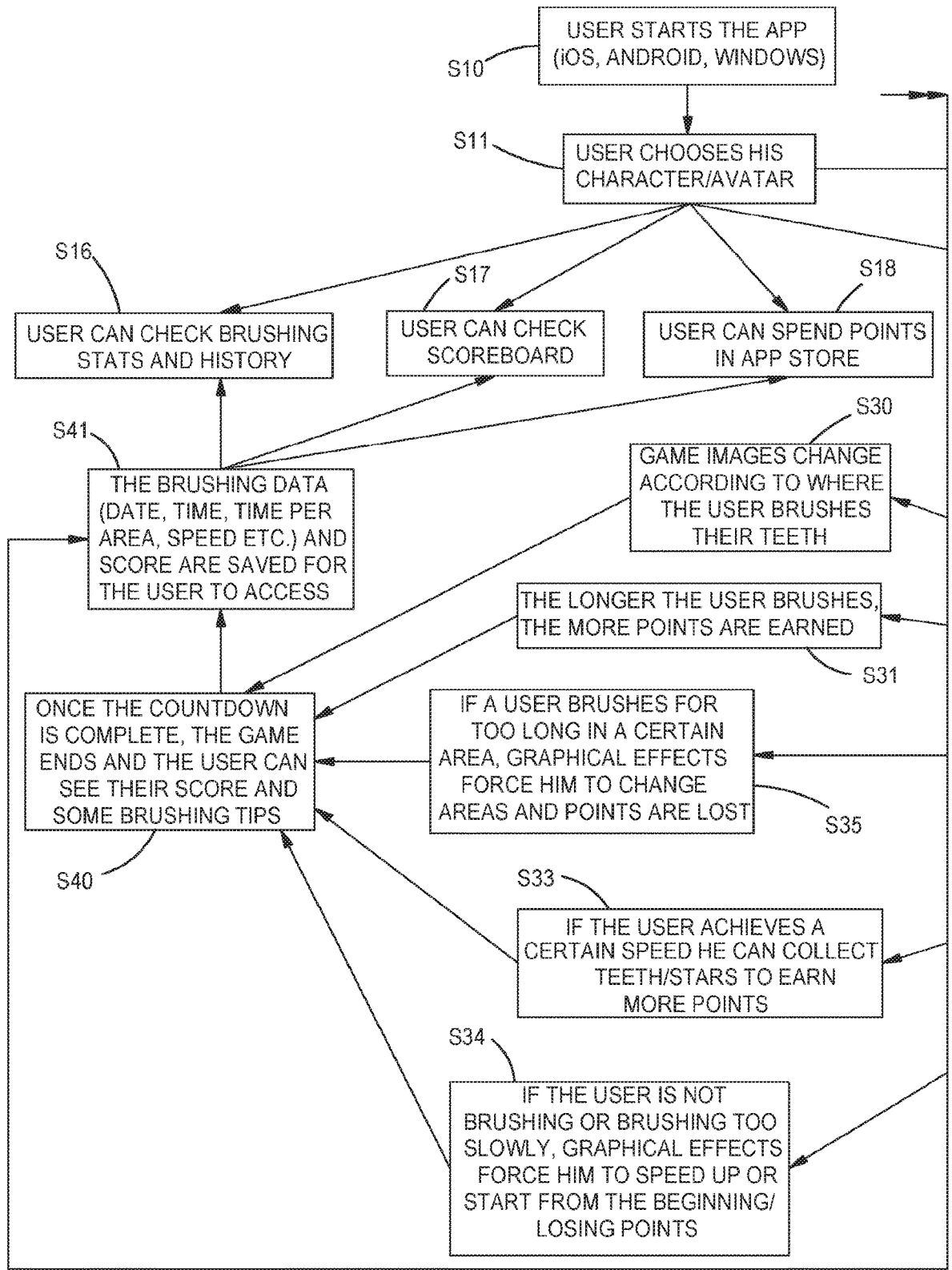
FIGS. 8a-8b are a flow chart of a software routine for visually displaying orientation information.
Figure 8B:
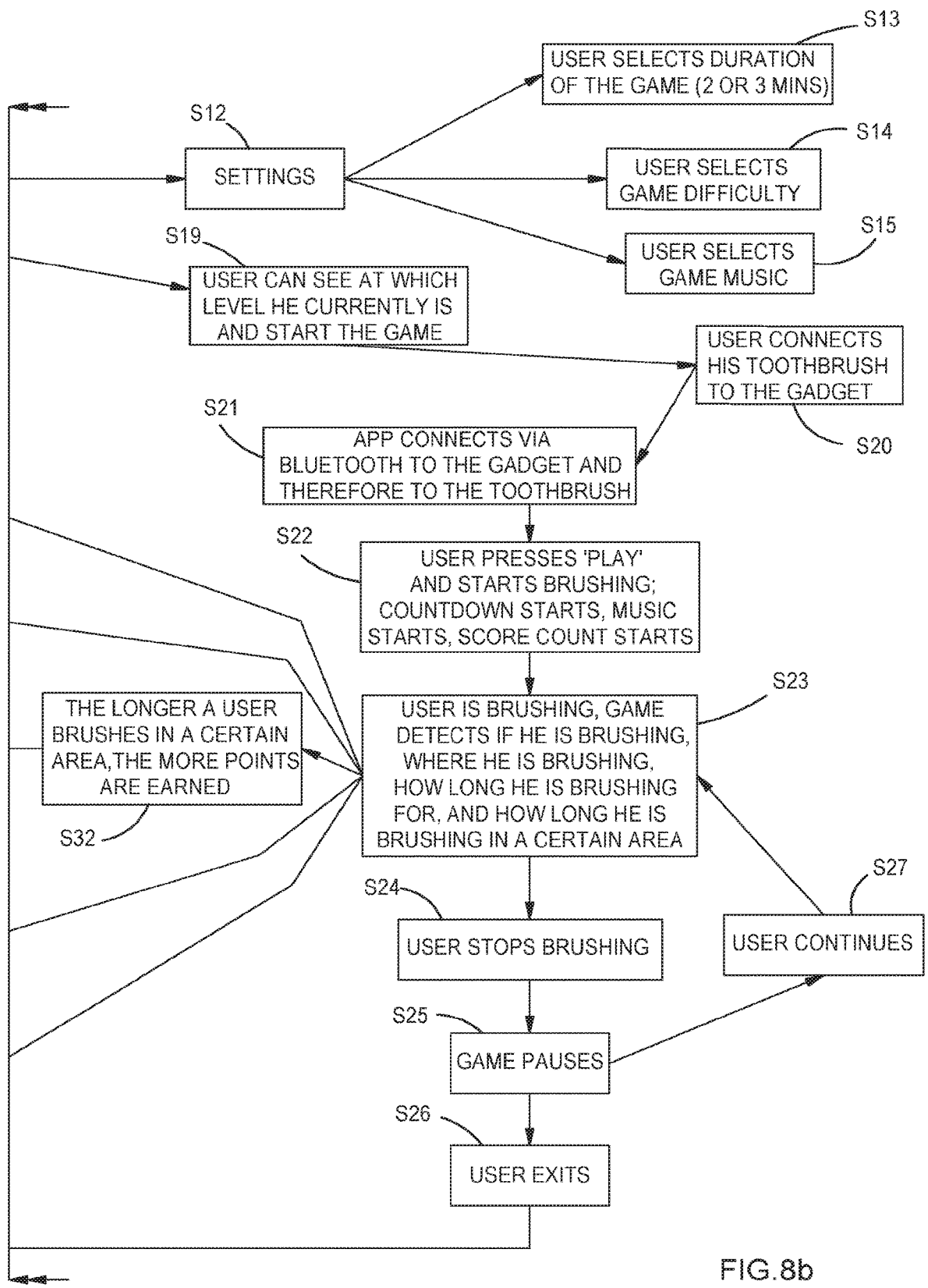

FIGS. 8a-8b show a flow chart outlining how the software application works.

A user starts the software application S10 on the mobile device 1. The software application then allows the user to select his character S11. Different users' profiles may be stored using the same software application.

Once a profile has been selected, the user is presented with various options. The user has the option to control various aspects of the game under a 'Settings' menu S12, including the level of game difficulty S14, the music S15, and the duration of the game S13. From their profile, the user is also able to view their brushing history and previous statistics relating to brushing S16. These statistics include, but are not limited to, which area of the mouth is being brushed, how long each area is being brushed for, how fast the user is brushing each area, and total time spent brushing teeth. The user can also check how many points they have scored to date, and where they feature on a leader board S17 of other users with the same software app. Stored points can be spent at an app store S18 to unlock new game features, for example a new level.

When a user is ready, they can select the game they wish to play on the software application S19. The user must then connect their toothbrush 4 to the toothbrush holder 10, which contains the sensors that provides the game with orientation data, S20. Once the toothbrush 4 and toothbrush holder 10 are connected, the software application will connect S21 to the toothbrush holder 10 via the Bluetooth Low Energy module 25.

Once the user has pressed 'Play' and commences brushing S22 (determined by the processors 29 in the mobile device 1), the game will begin to play, a timer will start and a new score count for that session will begin. The game will begin recording information about how the user is brushing their teeth S23.

If, at any time during the game, the user stops brushing their teeth S24, the game is paused S25. If the user then resumes brushing their teeth within a certain time limit, the game is resumed S26. If the user fails to resume brushing their teeth within the time limit, the game will be quit. Alternatively the user can chose to exit the game themselves S27. Once the game has been exited, brushing data for that session is recorded and can be accessed by the user later S41.

While the user is brushing their teeth, the processors 29 output the current location of the toothbrush 4 in the mouth 34. Each orientation corresponds to a different location in the mouth 34. The location of the toothbrush 4 in the mouth 34 is converted into a position of an object 9 within the game. In this way, the position of a controllable object 9 in the game directly relates to the orientation of the toothbrush 4. This visual representation allows the user to clearly see where they are brushing. As the user changes from a first orientation 41 to a second orientation 33, the object 9 in the game will move from a first position 11 to a second position 13. The image being displayed to the user during game play therefore changes according to where in the mouth 34 the user is brushing S30. In-game obstacles or collectables may be strategically placed at particular positions in the game. As these positions correspond to particular regions, and orientations, of the toothbrush 4 in the user's mouth 34, the user is discouraged or encouraged to brush in a particular location. In this way the game can be used to instruct the user to brush different regions of the mouth.

In-game rewards are earned by the user brushing the mouth for longer S31, brushing all areas of the mouth adequately S32, and achieving a certain brushing speed S33. The rewards are designed to promote good oral hygiene by encouraging the user to brush at optimum speeds for recommended amounts of time.

If the user brushes their teeth too slowly or stops, the in-game image being displayed will change and points will be taken off the cumulative score for that session, encouraging the user to speed up S34. Similarly, if the user only concentrates on brushing one area of their mouth, the displayed image will change encouraging the user to change where in the mouth they are brushing S35.

Once the timer has completed its countdown, the game is ended and the user can view their score and information about how they were brushing their teeth S40. Brushing data for that session is then recorded and available for the user to access later S41.

When a user is not brushing their teeth, they may want to find out information about the status of their toothbrush orientation system 2. Information that may be of interest includes whether the toothbrush orientation system 2 is on or off, the battery life, and whether the toothbrush system 2 is connected to the software application.

An LED light system 31 is located within the internal casing 26 of the toothbrush holder 10. The LED light system 31 includes at least one coloured light (not shown) and at least one white light (not shown). The second, lower portion 13 of the internal casing 26 is constructed of a material that allows light to pass through it, allowing the user to see any light being emitted by the LEDs. Light being emitted by the LEDs will cause an external part of the toothbrush holder 10 to glow. For a user to receive feedback about the status of the toothbrush orientation system 2, the user can either use voice commands or a series of physical commands that have been programmed into the LED light system 31. The processors 29 process the input from the user and the LEDs communicate information about the status of the device via blinking, pulsing, flashing etc., and using different colours. Physical commands include tapping the base 12 of the toothbrush holder 10 on a surface, the taps corresponding to a programmed set of instructions.

FIG. 9 illustrates some commands that may be programmed and the corresponding signal emitted by the LEDs. The toothbrush orientation system 2 is turned on or off by tapping the base 12 twice within a certain time limit. If the system 2 turns on, LEDs will gradually increase in brightness from off to on S73. If the system turns off, LEDs will gradually fade from on to off S74. If the user taps the base 12 on a surface once, information about the status of the toothbrush system 2 will be communicated to the user. If the system 2 is already on the LEDs will emit three blinks S70. If the system 2 is off then no light will be emitted S71. If the system 2 is connected to the software application and ready to be used for brushing, a pulse of light will be emitted for a predetermined length of time S72. If the system 2 is loading, or in the process of connecting to the software application, a solid light will be displayed for a predetermined length of time S75. If the user speaks the name of the orientation system 2, the LEDs will emit 3 flashes, indicating it is ready to be used S76.

The colour of light emitted by the LEDs depends on the amount of charge in the battery. If the battery is fully charged, the LEDs will emit white light. Once the battery has reached a sufficiently low level of charge, the LEDs will emit a coloured light to inform the user that the battery needs to be charged.

The invention claimed is:

1. A system for determining an orientation of a toothbrush, comprising:
   an orientation sensor configured for attachment to the toothbrush; and
   at least one processor configured to receive orientation information from the orientation sensor and to determine whether the orientation sensor is in a first orientation or a second orientation;
   wherein the first orientation corresponds to use of the toothbrush on a surface of teeth on a left side of a user's mouth,
   wherein the second orientation corresponds to use of the toothbrush on a surface of teeth on a right side of the user's mouth,
   wherein the orientation sensor is included in a toothbrush holder, the toothbrush holder comprising:
      a sleeve for accommodating the toothbrush, wherein the toothbrush has a relatively narrow upper end and a relatively broad lower end, and wherein the sleeve has a shape that is flared outwardly between the relatively narrow upper end and the relatively broad lower end; and
      a base for supporting the sleeve in a vertical orientation, and
   wherein the relatively broad lower end of the sleeve comprises an elastic inner wall and an outer wall which are spaced apart to allow the elastic inner wall to flex toward the outer wall.

2. The system of claim 1, wherein there is a plane of symmetry defined with respect to the user's mouth and wherein in the first orientation the toothbrush has a longitudinal axis which subtends an angle on a left side of the plane, and in the second orientation the toothbrush has a longitudinal axis which subtends an angle on a right side of the plane, corresponding to the left side and the right side of the user's mouth respectively.

3. The system of claim 2, wherein the angle subtended on the left side of the plane of symmetry corresponding to the first orientation is separated from the angle subtended on the right side of the plane of symmetry corresponding to the second orientation by substantially 180°.

4. The system of claim 1, wherein the at least one processor is configured to determine whether the orientation sensor is in a third orientation or a fourth orientation, wherein the third orientation corresponds to use of the toothbrush on an upper surface of bottom teeth of the user's mouth, and wherein the fourth orientation corresponds to use of the toothbrush on a lower surface of top teeth of the user's mouth.

5. The system of claim 4, wherein the third orientation corresponding to the upper surface of the bottom teeth of the user's mouth is distinguished from the fourth orientation corresponding to the lower surface of the top teeth of the user's mouth through a substantially 180° rotation movement about a longitudinal axis of the toothbrush.

6. The system of claim 1, wherein the at least one processor is configured to determine whether the orientation sensor is in a fifth orientation or a sixth orientation, wherein the fifth orientation corresponds to use of the toothbrush on an inside surface of top teeth of the user's mouth, and wherein the sixth orientation corresponds to use of the toothbrush on an inside surface of bottom teeth of the user's mouth.

7. The system of claim 6, wherein there is a horizontal plane defined with respect to the user's mouth, and wherein in the fifth orientation the toothbrush has a longitudinal axis which subtends a first angle on an upper side of the horizontal plane, and in the sixth orientation the toothbrush has a longitudinal axis which subtends a second angle on a lower side of the horizontal plane, corresponding to the top and bottom of the user's mouth respectively.

8. The system of claim 1, wherein the orientation sensor comprises an accelerometer and wherein the at least one processor is configured to determine a directional pull of gravity using information received from the accelerometer.

9. The system of claim 8, wherein the directional pull of gravity is used as an initialisation value to determine the orientation of the toothbrush in space.

10. The system of claim 1, wherein the orientation sensor is detachably coupled to the toothbrush.

11. The system of claim 1, wherein the orientation sensor is coupled to the toothbrush in a unique configuration relative to the toothbrush.

12. The system of claim 1, wherein the determination of the first orientation and the second orientation by the at least one processor are used as inputs to control a game on an electronic computing device.

13. The system of claim 1, wherein the at least one processor is configured to determine a unique maximum and minimum threshold value for each of the first orientation and the second orientation of the toothbrush for a particular user.

14. The system of claim 13, wherein the at least one processor is configured to store, and later recall, the unique maximum and minimum threshold values associated with the particular user.

15. The system of claim 1, the toothbrush holder comprising a fluid tight internal casing for housing the orientation sensor, wherein the fluid tight internal casing is placed between one end of the sleeve and the base.

16. A system for determining an orientation of a toothbrush, comprising:
an orientation sensor configured for attachment to the toothbrush, the orientation sensor comprising an accelerometer; and
at least one processor configured to receive orientation information from the orientation sensor and to determine whether the orientation sensor is in one of a plurality of different orientations corresponding to an area of a user's mouth, the plurality of different orientations comprising:
an orientation corresponding to use of the toothbrush on a front surface of teeth on a left side of the user's mouth;
an orientation corresponding to use of the toothbrush on a front surface of teeth on a right side of the user's mouth;
an orientation corresponding to use of the toothbrush on an inside surface of top teeth of the user's mouth; and
an orientation corresponding to the use of the toothbrush on an inside surface of bottom teeth of the user's mouth;
wherein the at least one processor is configured to process data from the accelerometer and to compare the resulting data with threshold values for each of the plurality of different orientations corresponding to the area of the user's mouth to determine whether the orientation sensor is in one of the plurality of different orientations,
wherein the at least one processor is configured to calculate a gravity component and a linear acceleration component of the data from the accelerometer, and to determine whether the gravity component and the linear acceleration component both fall within a maximum value and a minimum value for a articular area of the user's mouth, and
wherein the gravity component has a maximum value and a minimum value associated with it in each of three orthogonal directions, and the linear acceleration component has a maximum value and minimum value associated with it in each of the three orthogonal directions.

17. The system of claim 16, wherein raw acceleration data is transmitted from the accelerometer via radio frequency to a mobile device.

18. The system of claim 17, further comprising the mobile device, wherein the mobile device is configured to receive the raw acceleration data and to feed the raw acceleration data into an algorithm, and wherein the algorithm is arranged to provide a visual indication of where the user is brushing.

19. The system of claim 16, wherein the at least one processor is configured to obtain the gravity component by low-pass filtering the data from the accelerometer, and to obtain the linear acceleration component by subtracting the gravity component from the data from the accelerometer.

20. A method of determining an orientation of a toothbrush, the method comprising:
producing orientation information using an orientation sensor configured for attachment to the toothbrush, the orientation sensor comprising an accelerometer;
receiving the orientation information from the orientation sensor at at least one processor, and using the at least one processor to determine whether the orientation sensor is in one of a plurality of different orientations corresponding to an area of a user's mouth, the plurality of different orientations comprising:
an orientation corresponding to use of the toothbrush on a front surface of teeth on a left side of the user's mouth;
an orientation corresponding to use of the toothbrush on a front surface of teeth on a right side of the user's mouth;
an orientation corresponding to use of the toothbrush on an inside surface of top teeth of the user's mouth; and
an orientation corresponding to the use of the toothbrush on an inside surface of bottom teeth of the user's mouth;
wherein the at least one processor processes data from the accelerometer and compares the resulting data with threshold values for each of the plurality of different orientations corresponding to the area of the user's mouth to determine whether the orientation sensor is in one of the plurality of different orientations, wherein the at least one processor calculates a gravity component and a linear acceleration component of the data from the accelerometer, and determines whether the gravity component and the linear acceleration component both fall within a maximum value and a minimum value for a particular area of the user's mouth, and wherein the gravity component has a maximum value and a minimum value associated with it in each of three orthogonal directions, and the linear acceleration component has a maximum value and a minimum value associated with it in each of the three orthogonal directions.

* * * * *